(12) United States Patent
Sadiq et al.

(10) Patent No.: US 11,038,643 B2
(45) Date of Patent: Jun. 15, 2021

(54) BEAM REPORTING FOR ACTIVE BEAMS

(71) Applicant: QUALCOMM Incorporated, San Diego, CA (US)

(72) Inventors: Bilal Sadiq, Basking Ridge, NJ (US); Juergen Cezanne, Ocean Township, NJ (US); Muhammad Nazmul Islam, Littleton, MA (US); Navid Abedini, Somerset, NJ (US); Xiao Feng Wang, San Diego, CA (US); Makesh Pravin John Wilson, San Diego, CA (US); Sony Akkarakaran, Poway, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/281,329

(22) Filed: Feb. 21, 2019

(65) Prior Publication Data

US 2019/0268118 A1    Aug. 29, 2019

Related U.S. Application Data

(60) Provisional application No. 62/636,141, filed on Feb. 27, 2018.

(51) Int. Cl.
| | |
|---|---|
| *H04L 5/00* | (2006.01) |
| *H04W 74/08* | (2009.01) |
| *H04L 12/24* | (2006.01) |
| *H04B 7/06* | (2006.01) |

(Continued)

(52) U.S. Cl.
CPC ........... *H04L 5/0048* (2013.01); *H04B 7/063* (2013.01); *H04B 7/0617* (2013.01); *H04B 7/0695* (2013.01); *H04B 7/088* (2013.01); *H04L 41/0654* (2013.01); *H04L 41/0813* (2013.01); *H04W 74/0833* (2013.01); *H04W 88/02* (2013.01)

(58) Field of Classification Search
CPC ....................................................... H04L 5/00
See application file for complete search history.

(56) References Cited

U.S. PATENT DOCUMENTS

| | | | |
|---|---|---|---|
| 2013/0215844 A1* | 8/2013 | Seol | ..................... H04B 7/0695 370/329 |
| 2014/0177607 A1 | 6/2014 | Li et al. | |
| 2017/0346544 A1 | 11/2017 | Islam et al. | |

(Continued)

OTHER PUBLICATIONS

International Search Report and Written Opinion—PCT/US2019/019269—ISA/EPO—dated Apr. 25, 2019.

*Primary Examiner* — Sulaiman Nooristany
(74) *Attorney, Agent, or Firm* — Holland & Hart LLP

(57) ABSTRACT

Methods, systems, and devices for wireless communications are described. A wireless device, such as a user equipment and/or a base station, may determine that an active transmit beam has changed from a first transmit beam to a second transmit beam, the second transmit beam being different from the first transmit beam. The wireless device may identify a reference signal identifier that is associated with the second transmit beam. The wireless device may update, based at least in part on the identifying, a channel state information (CSI) resource setting to include the reference signal identifier, wherein the CSI resource setting is associated with the active transmit beam.

39 Claims, 12 Drawing Sheets

(51) Int. Cl.
*H04B 7/08* (2006.01)
*H04W 88/02* (2009.01)

(56) References Cited

U.S. PATENT DOCUMENTS

2018/0131434 A1* 5/2018 Islam .................... H04W 16/28
2019/0089435 A1* 3/2019 Mondal ................. H04B 7/026

* cited by examiner

BEAM REPORTING FOR ACTIVE BEAMS

CROSS REFERENCES

The present application for patent claims the benefit of U.S. Provisional Patent Application No. 62/636,141 by SADIQ, et al., entitled "BEAM REPORTING FOR ACTIVE BEAMS," filed Feb. 27, 2018, assigned to the assignee hereof, and expressly incorporated herein.

BACKGROUND

The following relates generally to wireless communications, and more specifically to beam reporting for active beams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some aspects, wireless communication systems may utilize channel measurement and reporting techniques in order to identify candidate transmit beams. For example, a base station and/or a UE may measure the channel performance metrics for one or more candidate transmit beams and transmit a feedback message based on the results of the measurements. Accordingly, the base station and/or UE may maintain a current list of available candidate beams that can be switched to in the event that the current active beam becomes unavailable or otherwise unsuitable for continued use.

Generally, wireless communication systems may use active transmit beam(s) to communicate control and/or data information between the wireless devices. For example, the active transmit beam(s) may be used by a base station (e.g., for downlink communications) or a UE (e.g., for uplink communications) to provide directionality, gain, and the like, for the control and/or data information being communicated.

In some aspects, there is a complicated and timely series of steps at a base station and/or UE must perform in order to obtain measurement reports for the current active transmit beam. For example, conventional techniques may include the base station using radio resource control (RRC) signaling to configure or update a channel state information (CSI) resource setting in response to a change of the currently active transmit beam. The base station may configure the CSI resource setting to provide an indication of which reference signals that the base station wants the UE to measure and report on. Whenever measurement and reporting are triggered, the UE may be configured to read the CSI resource setting and perform channel measurement and reporting accordingly. However, the active transmit beams may change more frequently than RRC signaling can support updating the CSI resource setting. This may result in excessive signaling and/or time delays in obtaining a measurement report for the active transmit beam.

SUMMARY

The described techniques relate to improved methods, systems, devices, and apparatuses that support beam reporting for active beams. Generally, the described techniques provide for associating certain reference signals to a corresponding available transmit beam, such that a wireless device can determine the active transmit beam based on which reference signals being used, or vice versa. Based on the knowledge of the reference signal being used for a corresponding active transmit beams, the wireless device may perform channel measurement on the reference signal in order to report the beam quality of the active transmit beam. For example, a first wireless device (e.g., a user equipment (UE) and/or a base station) may be using a first transmit beam as the active transmit beam. The active transmit beam may be used for communicating control information and/or data information. For various reasons, the first wireless device may change from the first transmit beam to a second transmit beam as the new active transmit beam.

A second wireless device (e.g., a base station and/or UE) may be configured, e.g., such as with a lookup table, that associates a particular reference signal to each transmit beam that can be used as an active transmit beam. Accordingly, the second wireless device may identify a reference signal identifier (e.g., such as an index number for a particular reference signal) that is associated with the second transmit beam, e.g., the new active transmit beam. In some aspects, once the second wireless device knows the reference signal identifier for the currently active transmit beam, a channel state information (CSI) resource setting may be updated to include the reference signal identifier. For example, a resource set of the CSI resource setting may be created for active transmit beams of the first wireless device. Generally, the resource set may include a reference signal identifier for some or all of the currently active transmit beam(s) that the first wireless is using. The second wireless device may perform channel measurements on the reference signals that are identified in the resource set and transmit feedback signals to the first wireless device based on the channel measurements. Accordingly, the described techniques enable the second wireless device to identify when a new transmit beam has become an active transmit beam of the first wireless device and provide channel performance feedback reporting on the new active transmit beam.

A method of wireless communication at a wireless device is described. The method may include determining that an active transmit beam has changed from a first transmit beam to a second transmit beam, the second transmit beam being different from the first transmit beam, identifying a reference signal identifier that is associated with the second transmit beam, and updating, based at least in part on the identifying, a CSI resource setting to include the reference signal identifier, wherein the CSI resource setting is associated with the active transmit beam.

An apparatus for wireless communication at a wireless device is described. The apparatus may include a processor, memory in electronic communication with the processor, and instructions stored in the memory. The instructions may be executable by the processor to cause the apparatus to determine that an active transmit beam has changed from a first transmit beam to a second transmit beam, the second transmit beam being different from the first transmit beam, identify a reference signal identifier that is associated with the second transmit beam, and update, based at least in part on the identifying, a CSI resource setting to include the reference signal identifier, wherein the CSI resource setting is associated with the active transmit beam.

Another apparatus for wireless communication at a wireless device is described. The apparatus may include means for determining that an active transmit beam has changed from a first transmit beam to a second transmit beam, the second transmit beam being different from the first transmit beam, means for identifying a reference signal identifier that is associated with the second transmit beam, and means for updating, based at least in part on the identifying, a CSI resource setting to include the reference signal identifier, wherein the CSI resource setting is associated with the active transmit beam.

A non-transitory computer-readable medium storing code for wireless communication at a wireless device is described. The code may include instructions executable by a processor to determine that an active transmit beam has changed from a first transmit beam to a second transmit beam, the second transmit beam being different from the first transmit beam, identify a reference signal identifier that is associated with the second transmit beam, and update, based at least in part on the identifying, a CSI resource setting to include the reference signal identifier, wherein the CSI resource setting is associated with the active transmit beam.

Some examples of the method, apparatuses, and non-transitory computer-readable medium described herein may further include operations, features, means, or instructions for receiving a transmission configuration index that provides an indication of the reference signal identifier. Some examples of the method, apparatuses, and non-transitory computer-readable medium described herein may further include operations, features, means, or instructions for determining that the active transmit beam may have changed to the second transmit beam based at least in part on the indication of the reference signal identifier being indicated in the transmission configuration index.

Some examples of the method, apparatuses, and non-transitory computer-readable medium described herein may further include operations, features, means, or instructions for identifying the reference signal identifier from the transmission configuration index.

Some examples of the method, apparatuses, and non-transitory computer-readable medium described herein may further include operations, features, means, or instructions for configuring, based at least in part on determining that the active transmit beam may have changed to the second transmit beam, a transmission configuration index that provides an indication of the reference signal identifier. Some examples of the method, apparatuses, and non-transitory computer-readable medium described herein may further include operations, features, means, or instructions for transmitting the transmission configuration index.

In some examples of the method, apparatuses, and non-transitory computer-readable medium described herein, determining that the active transmit beam may have changed comprises receiving a random access channel (RACH) signal on the second transmit beam.

In some examples of the method, apparatuses, and non-transitory computer-readable medium described herein, identifying the reference signal identifier that may be associated with the second transmit beam comprises identifying a reference signal associated with the RACH signal.

Some examples of the method, apparatuses, and non-transitory computer-readable medium described herein may further include operations, features, means, or instructions for identifying a beam failure indication, wherein identifying the reference signal identifier associated with the second transmit beam may be based at least in part on a beam failure recovery transmit beam.

In some examples of the method, apparatuses, and non-transitory computer-readable medium described herein, the reference signal identifier that may be associated with the second transmit beam comprises an identifier of a reference signal that may be used for beam failure detection of the active transmit beam.

Some examples of the method, apparatuses, and non-transitory computer-readable medium described herein may further include operations, features, means, or instructions for performing a channel measurement procedure on one or more reference signals that may be identified in the resource set. Some examples of the method, apparatuses, and non-transitory computer-readable medium described herein may further include operations, features, means, or instructions for transmitting a feedback message comprising information associated with a result of the channel measurement procedure.

Some examples of the method, apparatuses, and non-transitory computer-readable medium described herein may further include operations, features, means, or instructions for receiving a trigger signal that indicates a measurement link, the measurement link comprising information associating the channel measurement procedure with the resource set, wherein the channel measurement procedure may be initiated in response to, and based at least in part on the trigger signal.

Some examples of the method, apparatuses, and non-transitory computer-readable medium described herein may further include operations, features, means, or instructions for identifying a configured set of available reference signal, wherein identifying the reference signal identifier associated with the second transmit beam may be based at least in part on the configured set of available reference signals.

Some examples of the method, apparatuses, and non-transitory computer-readable medium described herein may further include operations, features, means, or instructions for determining that the reference signal identifier may be not included in the configured set of available reference signals. Some examples of the method, apparatuses, and non-transitory computer-readable medium described herein may further include operations, features, means, or instructions for identifying the reference signal identifier from a transmission configuration index.

In some examples of the method, apparatuses, and non-transitory computer-readable medium described herein, the active transmit beam may be associated with a control channel, or a data channel, or both the control channel and the data channel.

In some examples of the method, apparatuses, and non-transitory computer-readable medium described herein, the active transmit beam may be associated with a subset of configured control resources.

Some examples of the method, apparatuses, and non-transitory computer-readable medium described herein may further include operations, features, means, or instructions for receiving a configuration signal indicating a first control resource for a first symbol and a second control resource for a second symbol, wherein the configuration signal identifies either the first control resource or the second control resource as being available for channel measurement. Some examples of the method, apparatuses, and non-transitory computer-readable medium described herein may further include operations, features, means, or instructions for updating, based at least in part on the configuration signal, the CSI resource setting to include either the identified first control resource or the identified second control resource.

In some examples of the method, apparatuses, and non-transitory computer-readable medium described herein, updating the CSI resource setting may include operations, features, means, or instructions for updating a resource set to include the reference signal identifier.

In some examples of the method, apparatuses, and non-transitory computer-readable medium described herein, the resource set comprises one or more reference signal identifiers, wherein each reference signal identifier may be associated with a corresponding active transmit beam.

In some examples of the method, apparatuses, and non-transitory computer-readable medium described herein, the reference signal identifier comprises a synchronization signal block (SSB) reference signal, or a physical broadcast channel (PBCH) block reference signal, or a CSI reference signal, or a sounding reference signal (SRS), or a beam reference signal (BRS), or a beam refinement reference signal (BRRS), or a tracking reference signal (TRS), or a combination thereof.

DETAILED DESCRIPTION

Figure 1:
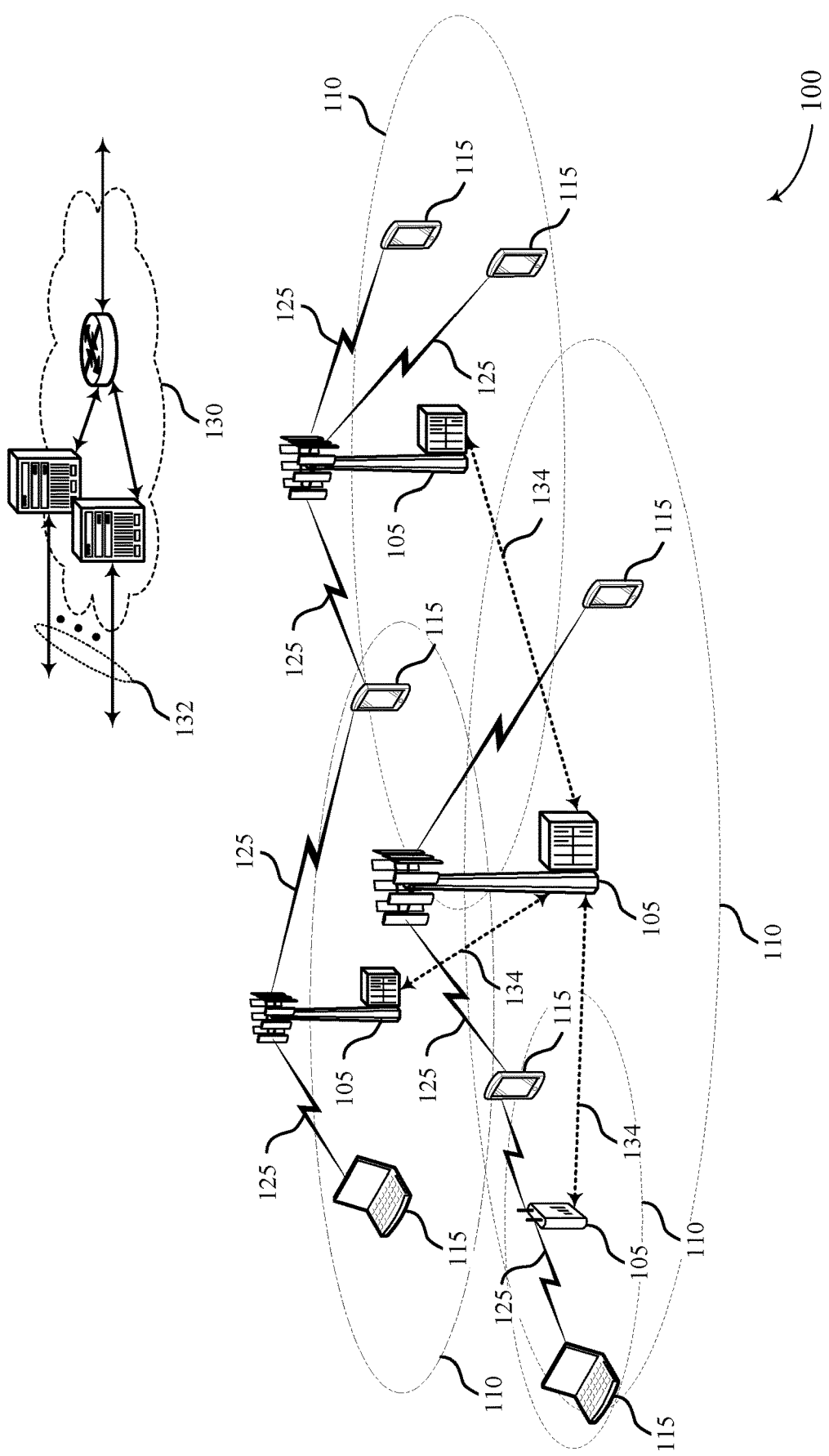
FIG. 1 illustrates an example of a wireless communications system that supports beam reporting for active beams in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

Generally, a wireless device such as a user equipment (UE) and/or a base station may be performing wireless communications using beamforming techniques that include one or more active transmit beams. For example, the wireless device may be using one active transmit beam to transmit data to a second wireless device, and a different active transmit beam to transmit control information to the second wireless device. In some aspects, the wireless device may have one or more active transmit beams for each wireless device that communications are being performed with. In some aspects, it may be beneficial for the wireless device to receive the feedback information regarding the channel performance of the currently active transmit beams. However, conventional techniques do not support the wireless device configuring the second wireless devices with the currently active transmit beams in a timely manner. For example, in some cases an active transmit beam may change before the wireless device can configure the second wireless device with the active transmit beams and request channel performance feedback information.

Aspects of the disclosure are initially described in the context of a wireless communications system. Generally, aspects of the described techniques provide for an efficient and quick mechanism that enables a wireless device to identify a reference signal that is associated with an active transmit beam that communications are being performed with. For example, a first wireless device and a second wireless device may be performing wireless communications using beamforming techniques that include one or more active transmit beams. In some cases, the active transmit beam of the first wireless device may change, e.g., from a first transmit beam to a second transmit beam. The second wireless device may determine that the active transmit beam of the first wireless device has changed to the second transmit beam. Accordingly, the second wireless device may identify a reference signal identifier that is associated with the second transmit beam. For example, the wireless devices may be configured with information that associates each available transmit beam with the corresponding reference signal identifier. Therefore, based on the information that the second transmit beam is now the active transmit beam, the second wireless device can identify which reference signal that uses the same antenna ports, uses the same antenna configurations, is quasi co-located (QCL) with respect to the second transmit beam, and the like, as the second transmit beam.

In some aspects, the second wireless device can update a channel state information (CSI) resource setting to include the reference signal identifier. For example, the second wireless device may create and/or maintain a resource set of the CSI resource setting that is associated with active transmit beam(s) of the first wireless device, and vice versa. The second wireless device may update the resource set any time an active transmit beam of the first wireless device changes, such that the second wireless device always knows which reference signal can be used to perform channel measurements on to report the channel performance of the active transmit beams of the first wireless device. The second wireless device may then provide feedback messages to the first wireless device based on the channel measurements of the reference signal associated with the active transmit beam in order to provide channel performance information to the first wireless device for its active transmit beams. In some aspects, the second wireless device can further update the CSI resource setting to exclude a reference signal identifier associated with the now-obsolete transmit beam, e.g., the first transmit beam. The second wireless device may exclude the reference signal identifier associated after the transmit beam change if the identifier is no longer associated with any active transmit beam. For example, the second device may purge from the CSI resource setting all obsolete reference signal identifiers such that the CSI resource setting contains reference signal identifiers for only the currently active transmit beam(s).

Aspects of the disclosure are further illustrated by and described with reference to apparatus diagrams, system diagrams, and flowcharts that relate to beam reporting for active beams.

FIG. 1 illustrates an example of a wireless communications system 100 that supports beam reporting for active beams in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A wireless device (e.g., such as a UE 15 and/or a base station 105) may determine that an active transmit beam (e.g., of a second wireless device) has changed from a first transmit beam to a second transmit beam. The second transmit beam may be different from the first transmit beam. The wireless device may identify a reference signal identifier that is associated with the second transmit beam. The wireless device may update, based at least in part on the identifying, a CSI resource setting to include the reference signal identifier. The CSI resource setting may be associated with the active transmit beam (e.g., the active transmit beams of the second wireless device).

Figure 2:
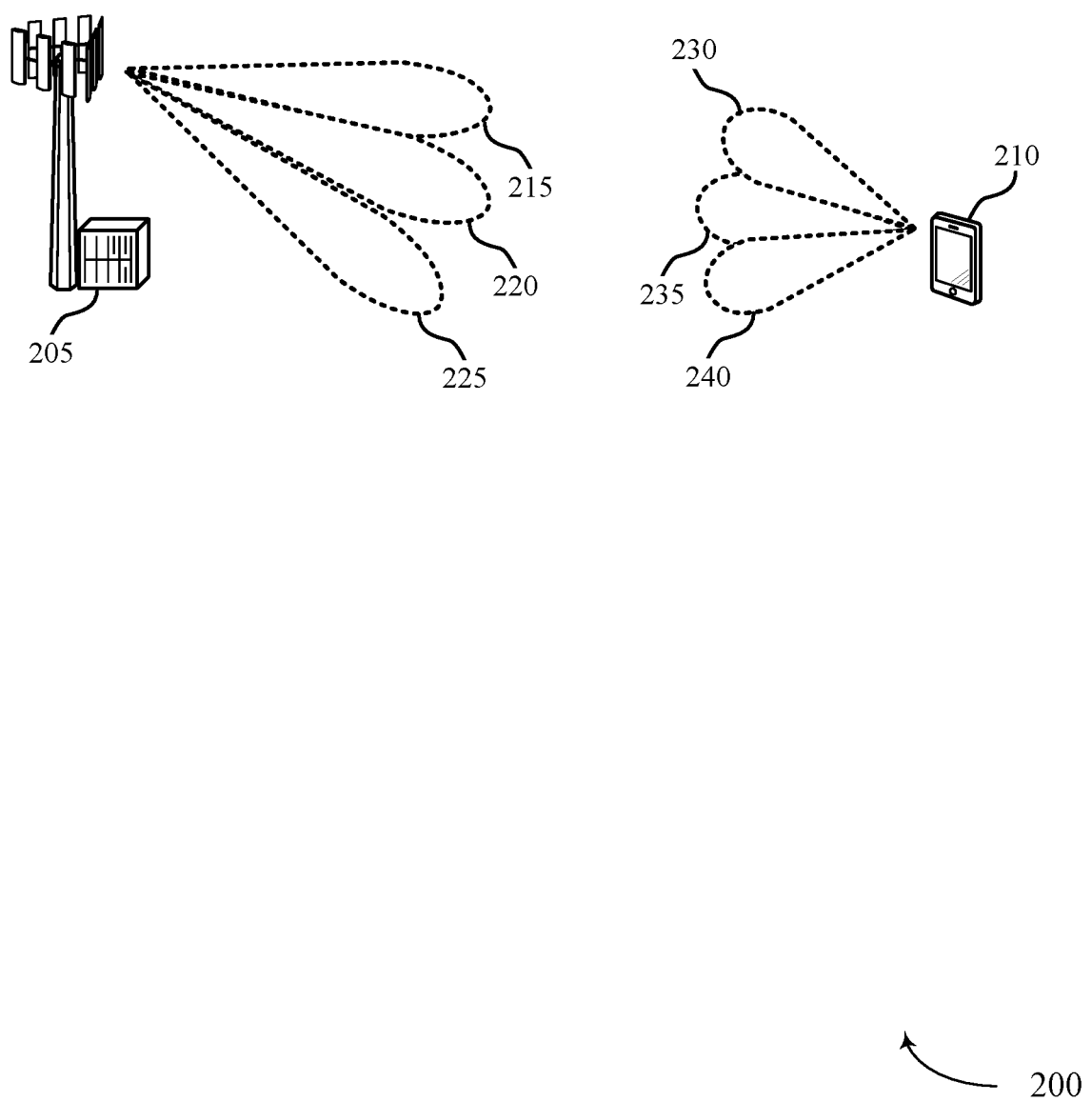
FIG. 2 illustrates an example of a wireless communication system that supports beam reporting for active beams in accordance with aspects of the present disclosure.

FIG. 2 illustrates an example of a wireless communication system 200 that supports beam reporting for active beams in accordance with aspects of the present disclosure. In some examples, wireless communication system 200 may implement aspects of wireless communication system 100. Wireless communication system 200 may include a base station 205 and a UE 210, which may be examples of the corresponding devices described herein.

In some aspects, wireless communication system 200 may be a mmW wireless network. For example, base station 205 may perform wireless communications with UE 210 using any of transmit beams 215, 220, and/or 225. Similarly, UE 210 may perform wireless communications with base station 205 using any of transmit beams 230, 235, and/or 240. It is to be understood, that more or fewer transmit beams may be used for wireless communications between base station 205 and UE 210. Generally, each wireless device (e.g., base station 205 and/or UE 210) may have one or more active transmit beams that are being used for wireless communications with the other wireless device. In some aspects, this may include different active transmit beams being used for data and control information. By way of example only, base station 205 may be using transmit beam 220 as an active transmit beam (e.g., a first transmit beam) with respect to UE 210, and UE 210 may be using transmit beam 235 as an active transmit beam (e.g., a first transmit beam) with respect to base station 205. In some aspects, the active transmit beams may change, e.g., due to mobility, interference, blockage, and the like.

Generally, it may be beneficial for each wireless device to receive channel performance information from the other wireless device with respect to its active transmit beams. Conventional techniques do not provide a mechanism that allows such feedback information in a timely manner. For example, conventional techniques require higher level signaling exchanges in order to configure the other wireless device with the current list of active transmit beams and then direct channel measurement and performance feedback reporting from the other wireless device.

That is, conventional techniques support channel measurement and performance feedback reporting in order to identify candidate transmit beams, e.g., to track beam strength, to identify emerging transmit beams, and the like. Generally, the feedback reporting may include various beam strength information measurements. Examples of the channel performance feedback reporting may include, but are not limited to, a reference signal received power (RSRP), a reference signal received quality (RSRQ), a signal-to-noise ratio (SNR), a signal-to-interference-plus-noise ratio (SINR), an estimated block level error rate (BLER), a working/failed indication, and the beam identifier associated with the measurements.

More particularly, conventional techniques may include wireless devices maintaining the CSI resource setting that identifies the different reference signals (e.g., that represent different candidate transmit beams) to perform general measurements on. The reference signals may include synchronization signal blocks (SSBs) (such as a synchronization signal (SS), a physical broadcast channel (PBCH) block, and the like) and/or CSI reference signals (CSI-RSs), from the base station 205 perspective, or a sounding reference signal (SRS) from the UE 210 perspective. Generally, base station 205 may configure a UE 210 with multiple CSI resource settings. In some aspects, the wireless devices may also maintain a CSI reporting setting that identifies the kind of measurement to perform and the configuration of the report to send. Again, base station 205 may configure UE 210 with multiple CSI reporting settings.

In some aspects, a measurement link may be used that links a CSI resource setting to a CSI reporting setting. For example, base station 205 may trigger a measurement link in order to obtain a channel performance feedback report on a particular CSI resource setting from UE 210. In some aspects, the trigger can be provided or otherwise indicated in a L1 message downlink control indicator (DCI), in a L2 message (e.g., using a medium access control (MAC) control element (CE) or a DCI addressed to a particular radio network temporary identifier (RNTI)), or in a L3 message (e.g., RRC configuration). This technique may be utilized by the base station 205 and/or UE 210 in order to measure and track potential candidate transmit beams.

However, should base station 205 and/or UE 210 desire to obtain a beam report on the currently active transmit beams, a CSI resource setting that includes the appropriate reference signals would need to be configured and the measurement and beam reports would need to be triggered. However, the active transmit beams may change rather quickly, e.g., using the MAC CE or DCI, whereas modifying or creating a CSI resource setting requires RRC signaling, which may take too much time and may not keep up with changing active transmit beams.

Aspects of the described techniques provide for base station 205 and/or UE 210 to create and maintain a resource set (which may be referred to as a special resource set in some instances) of the CSI resource setting that is associated with active transmit beams of the other wireless device. For example, base station 205 may create and maintain a resource set of the CSI resource setting that is associated with some or all of the active transmit beams of UE 210, and UE 210 may create and maintain a resource that of the CSI resource setting that is associated with some or all of the active transmit beams of a base station 205. The resource set may have a particular identifier (e.g., resource set ID=0) or other identifier that is indicated by the base station 205. The resource set may include an identifier of a reference signal that is associated with an active transmit beam. In some aspects, an identifier of a reference signal that is associated with the currently active transmit beam being used for a channel may refer to the transmit beam being used for the channel being the same as the transmit beam being used for the reference signal. That is, the antenna ports for the reference signal and the antenna ports for the channel may be spatially QCL. In some aspects, the reference signal identifier may be indicated in an active transmission configuration index (TCI) state for a control channel (e.g., a PDCCH and/or a PUCCH) and/or a data channel (e.g., a PDSCH and/or PUSCH). In some aspects, this may include the same reference signal that is being used to control beam failure detection.

In some aspects, the base station 205 may configure UE 210 with the set of reference signals, and UE 210 may select suitable reference signals from that configured set. In the instance where the configured set does not contain any reference signal associated with the currently active transmit beam of a channel, then UE 210 may select the reference signal identifier indicated in the TCI state of that channel, e.g., priority may be given to the reference signals in the configured set of reference signals from base station 205.

In some aspects, the described techniques may be utilized for a transmit beam in a control channel. For example, the resource set of the CSI resource setting may contain a reference signal only for the active control beams (e.g., the beams being used for the control channel). As another example, the resource set of the CSI resource setting may contain reference signals only for the active beams being used for a subset of control resources, where the subset is indicated by the base station 205. For example, UE 210 may be configured with two control resources (a first control resource for a first symbol of a slot and a second control resource for a second symbol of the slot), but the base station 205 may trigger UE 210 to include in the resource set of the CSI resource setting only the transmit beams used only for the first control resource.

Accordingly, whenever the active transmit beam changes for a channel (e.g., a control beam is changed through a MAC CE), the resource set of the CSI resource setting may be updated. That is, a first wireless device (e.g., either base station 205 or UE 210) may determine that an active transmit beam has changed from a first transmit beam to a second transmit beam for the other wireless device (e.g., either UE 210 or base station 205). Generally, the second transmit beam may be different from the first transmit beam (e.g., may use different antenna ports, etc.). Thus, and continuing with the example above, base station 205 may change the active transmit beam from transmit beam 220 to transmit beam 215 (the second transmit beam). Similarly, UE 210 may change the active transmit beam from transmit beam 235 to transmit beam 230 (the second transmit beam).

The first wireless device may identify a reference signal identifier that is associated with the second transmit beam and update the CSI resource setting to include the reference signal identifier, e.g., may update the resource set of the CSI resource setting that is associated with the active transmit beams of the second wireless device. In some aspects, this may include the first wireless device receiving a TCI state indication that includes or otherwise provides an indication of the reference signal identifier. As the active transmit beam has changed from the first transmit beam to the second transmit beam, the TCI state indication may indicate a new reference signal identifier, which may provide the indication that the active transmit beam has changed. Accordingly, the second wireless device may configure (e.g., when there is a change to the active transmit beam) the TCI state indication to include the reference signal identifier.

In some aspects, the first wireless device may determine that the active transmit beam is changed based on a random access channel (RACH) signal on the second transmit beam. For example, UE 210 may transmit a RACH signal to base station 205 using transmit beam 230. In this example, base station 205 may identify which reference signal is associated with the RACH signal and this may indicate the identifier of the reference signal that is associated with the second transmit beam.

In some aspects, the first wireless device may identify the reference signal identifier based on a beam failure indication. For example, the first wireless device may determine an identifier of a reference signal that is used for beam failure detection of the active transmit beam and use that information to identify the reference signal identifier that is associated with the second transmit beam.

In some aspects, the first wireless device may send a command, e.g., in MAC-CE, to the second wireless device, the command to include and/or to exclude reference signal identifier(s) from the CSI resource setting. For example, the reference signal identifier(s) to be included may be associated with active transmit beam(s), e.g., the second transmit beam and the reference signal identifier(s) to be excluded may be associated with a now-obsolete transmit beam(s), e.g., the first transmit beam.

Accordingly, the first wireless device may update the CSI resource setting and perform a channel measurement procedure on the reference signals that are identified in the resource set. The first wireless device may transmit a feedback message that includes or otherwise provides an indication of information associated with a result of the channel performance measurement procedure to the second wireless device. In some aspects, the channel measurement procedure may be triggered by a trigger signal that includes or otherwise provides an indication of the measurement link.

Figure 3:
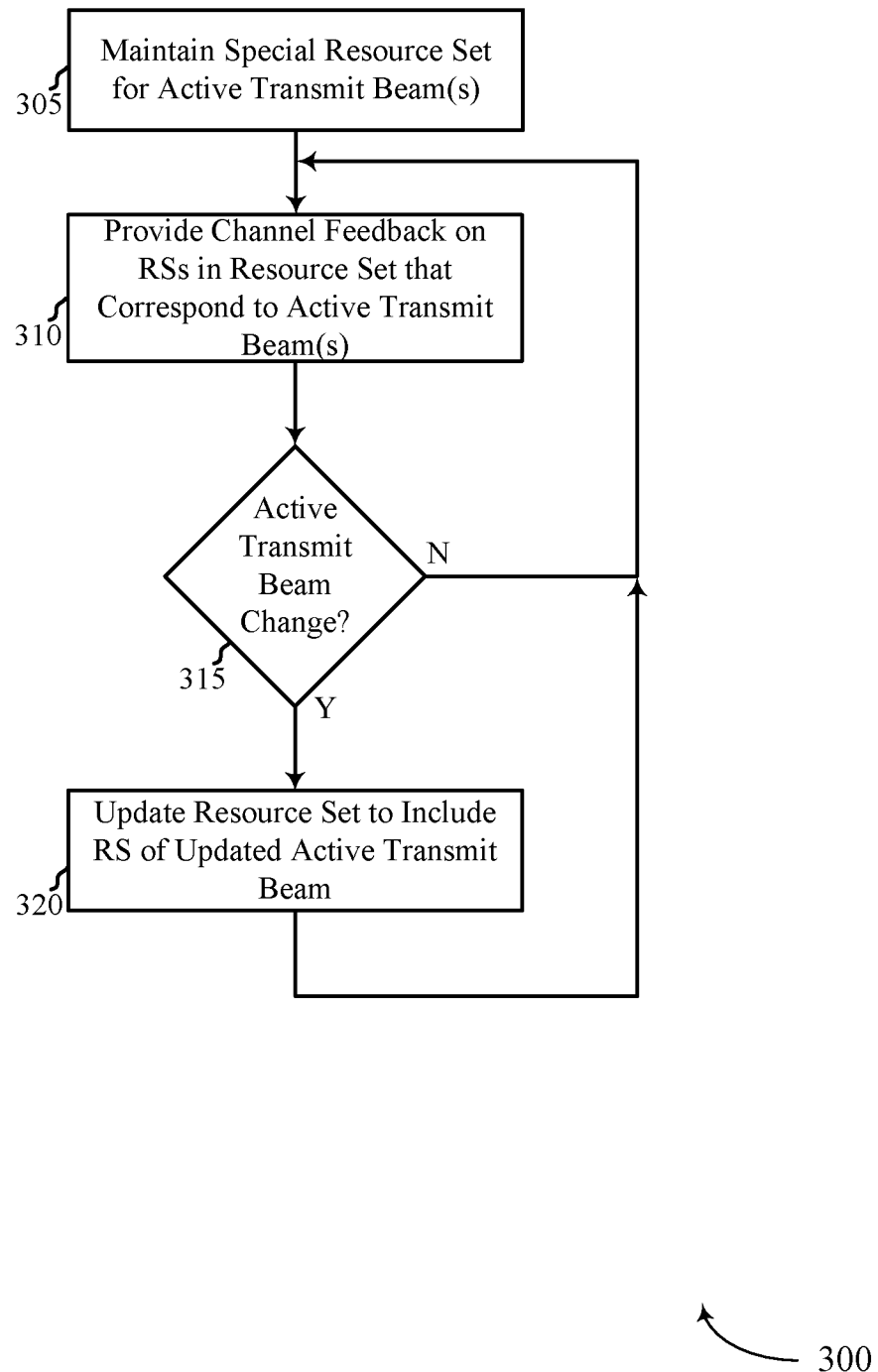
FIG. 3 illustrates an example of a flowchart that supports beam reporting for active beams in accordance with aspects of the present disclosure.

FIG. 3 illustrates an example of a flowchart 300 that supports beam reporting for active beams in accordance with aspects of the present disclosure. In some examples, flowchart 300 may implement aspects of wireless communication systems 100/200. Aspects of flowchart 300 may be implemented by a wireless device, which may be an example of a UE and/or a base station as is described herein.

At 305, a first wireless device may maintain a special resource set of a CSI resource setting that is associated with some or all of the active transmit beam(s) of a second wireless device. For example, the first wireless device may be configured with CSI reference signal (RS) resources, SS/PBCH block resources, or both CSI-RS and SS/PBCH block resources. In some aspects, the first wireless device may be configured with CSI-RS resource setting of up to 16 CSI-RS resources having up to 64 resources within each set. One or more of the CSI-RS resources may be associated with active transmit beam(s) of the second wireless device. In some aspects, the total number of different CSI-RS resources over all resources may be limited to 128.

In some aspects, each CSI resource setting (ResourceConfig) contains a configuration of S≥1 CSI resource sets (higher layer parameter ResourceSetConfig), with each resource set consisting of CSI-RS resources (higher layer parameters NZP-CSI-RS-ResourceConfigList and CSI-IM-ResourceConfigList) and SS/PBCH block resources used for L1-RSRP computation (higher layer parameter resource-config-SS-list). In some aspects, each resource setting may be located in the downlink bandwidth part (BWP) identified by the higher layer parameter BWP-info, and all resource settings linked to a CSI report setting may have the same downlink BWP.

In some aspect, each reporting setting (ReportConfig) may be associated with a single downlink BWP (indicated by higher layer parameter bandwidthPartId) and may contain the reported parameter(s) for one CSI reporting band. The parameters may include: CSI Type (I or II) if reported; codebook configuration including codebook subset restriction; time-domain behavior; frequency granularity for channel quality indicator (CQI) and pre-coding matrix indicator (PMI); measurement restriction configurations; the layer indicator (LI); the reported L1-RSRP parameter(s), CRI, and SSB resource indicator (SSBRI).

In some aspects, each ReportConfig contains: a ReportConfigID to identify the ReportConfig; a ReportConfigType to specify the time domain behavior of the report (either aperiodic, semi-persistent, or periodic); a ReportQuantity to indicate the CSI-related or L1-RSRP-related quantities to report; and/or a ReportFreqConfiguration to indicate the reporting granularity in the frequency domain. In some aspects, each link MeasLinkConfig in the higher layer-configured CSI measurement setting contains the CSI reporting setting indication, the CSI resource setting indication, and/or the MeasQuantity indication.

Accordingly, the first wireless device may maintain the special resource set of the CSI resource setting that is associated with some or all of the active transmit beams of the second wireless device. In some aspects, the first wireless device may maintain a special resource set for active transmit beam(s) of each wireless device that it is performing wireless communications with.

At 310, the first wireless device may perform channel measurement procedures and provide channel feedback on the reference signals that are included in the special resource set, where the reference signals correspond to active transmit beams. In some aspects, the channel measurement procedures and channel feedback reporting may be triggered by the second wireless device, e.g., using the measurement link signal as is described above.

In some aspects, the reference signal identifier may include an identifier associated with at least one of: a SSB reference signal, or a PBCH block reference signal, or a CSI-RS, or a SRS, or a beam reference signal (BRS), or a beam refinement reference signal (BRRS), or a tracking reference signal (TRS), a position tracking signal, or any combination thereof.

At 315, the first wireless device may determine whether an active transmit beam of the second wireless device has changed. In some aspects, this may include a TCI state indication that includes an identifier of a reference signal that was previously not included in the TCI state indication. That is, the change in the reference signal indicated in the TCI state indication may signal that the active transmit beam has changed from a first transmit beam to a second transmit beam. In some aspects, this may include the first wireless device receiving a RACH signal on the second transmit beam. For example, the RACH signal may have a reference signal that is associated with a RACH signal, and receiving the RACH signal may therefore provide an indication of the associated reference signal.

In some aspects, this may be based on a beam failure indication. For example, the first wireless device may identify the reference signal identifier associated with the second transmit beam based at least in part on a beam failure recovery transmit beam. That is, the reference signal identifier that is associated with a second transmit beam may include an identifier of a reference signal that is used for beam failure detection of the active transmit beam.

If there has been no change to the active transmit beam, the first wireless device may return to 310 and continue to perform the channel measurement procedures and provide channel feedback to the second wireless device on the reference signals that are included in the special resource set.

If there has been a change to the active transmit beam, at 320 the first wireless device may update the special resource set to include the reference signals of the updated transmit beam. For example, each wireless device may be preconfigured (e.g., by base station or network) with a listing of available transmit beams and, for each available transmit beam, an associated reference signal identifier. Accordingly, based on the change in the active transmit beam to the second transmit beam, the first wireless device may identify the reference signal identifier of the second transmit beam. Updating the special resource set of the CSI resource setting to include the identifier of the reference signal associated with the updated active transmit beam may provide a mechanism where the first wireless device is able to provide channel measurement and feedback reporting of the active transmit beam(s) of the second wireless device.

Figure 4:
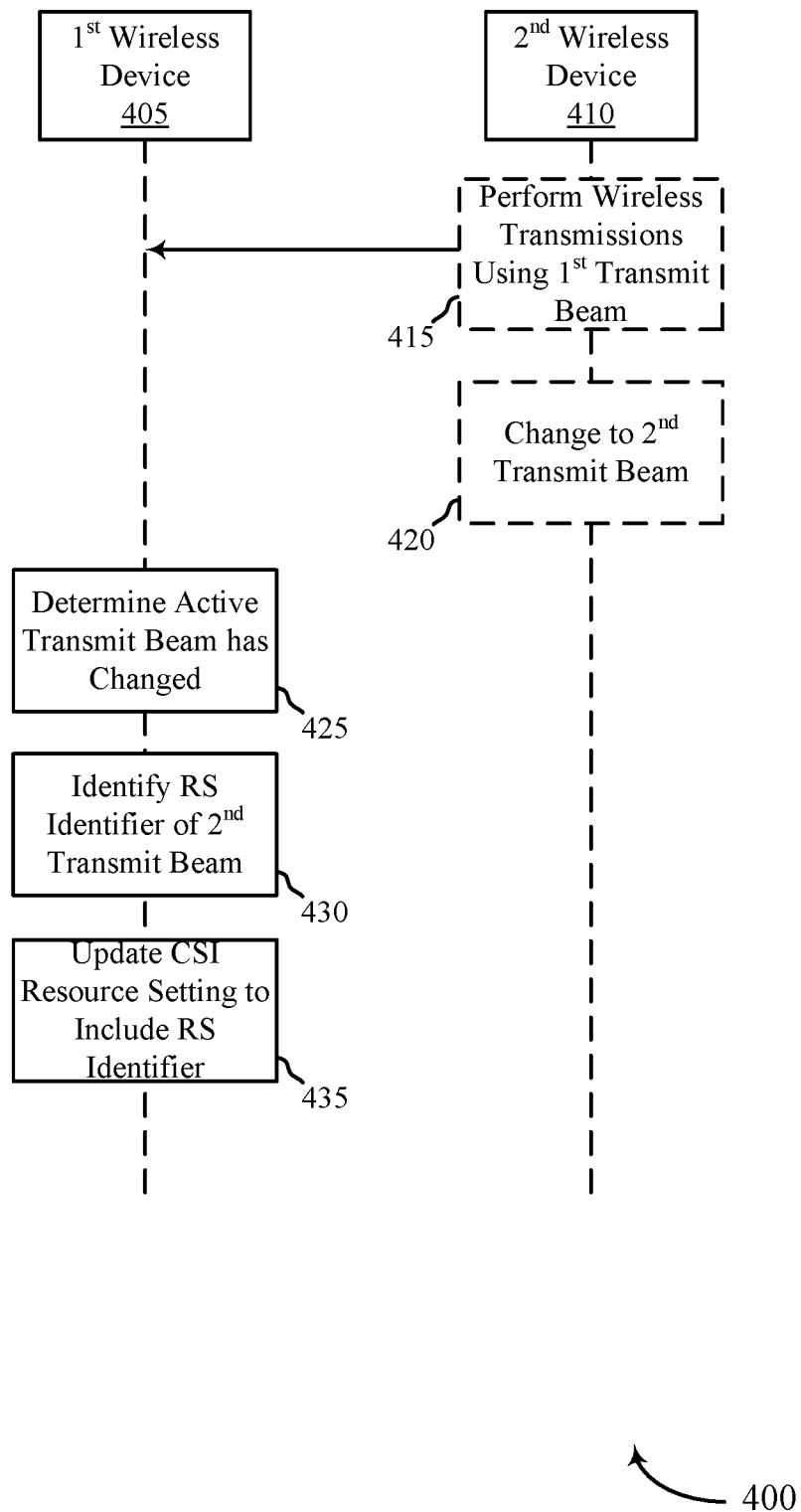
FIG. 4 illustrates an example of a process that supports beam reporting for active beams in accordance with aspects of the present disclosure.

FIG. 4 illustrates an example of a process 400 that supports beam reporting for active beams in accordance with aspects of the present disclosure. In some examples, process 400 may implement aspects of wireless communication systems 100/200. Process 400 may include a first wireless device 405 and a second wireless device 410, each of which may be examples of a UE and/or a base station as is described herein.

At 415, the second wireless device 410 may be optionally performing wireless transmissions to the first wireless device 405 using a first transmit beam as the active transmit beam. The active transmit beam may be used to communicate control information and/or data information to the first wireless device 405.

At 420, the second wireless device 410 may optionally change the active transmit beam from the first transmit beam to a second transmit beam. The change to the second transmit beam may be in response to movement of the first wireless device 405 and/or the second wireless device 410, blockage of the first transmit beam, interference with respect to the first transmit beam, and the like.

At 425, the first wireless device 405 may determine that the active transmit beam as changed from the first transmit beam to a second transmit beam. The second transmit beam may be different from the first transmit beam. At 430, the first wireless device 405 may identify a reference signal identifier that is associated with the second transmit beam. For example, the first wireless device 405 may receive a TCI that includes or otherwise provides an indication of the reference signal identifier.

In some aspects, this may include the first wireless device 405 receiving a TCI (e.g., a TCI state indication) that provides an indication of the reference signal identifier. For example, the first wireless device 405 may determine that the active transmit beam has changed to the second transmit beam based, at least in some aspects, on the indication of the reference signal identifier being included in the TCI. Accordingly, the first wireless device 405 may identify the reference signal identifier from the TCI. Generally, the second wireless device 410 may configure the TCI to provide the indication of the reference signal identifier in response to the active transmit beam changing to the second transmit beam.

In some aspects, this may include the second wireless device 410 transmitting a RACH signal to the first wireless device 405 using the second transmit beam. For example, the first wireless device 405 may identify a reference signal that is associated with the RACH signal, which may provide for identification of the reference signal identifier that is associated with the second transmit beam.

In some aspects, this may include or otherwise be based on a beam failure indication. For example, the first wireless device 405 may identify the reference signal identifier associated with the second transmit beam based on a beam failure recovery transmit beam received from the second wireless device 410. In this example, the reference signal identifier that is associated with the second transmit beam may include an identifier of a reference signal that is used for beam failure detection of the active transmit beam.

At 435, the first wireless device 405 may update, based at least in part on identifying the reference signal identifier, a CSI resource setting to include the reference signal identifier. The CSI resource setting may be associated with the active transmit beam, e.g., may include a resource set of the CSI resource setting that is associated with some or all of the active transmit beams of the second wireless device 410. For example, the first wireless device 405 may update a resource set (e.g., special resource set that is created and maintained for the active transmit beams of the second wireless device 410) of the CSI resource setting. Accordingly, the first wireless device 405 may perform a channel measurement procedure on the reference signals that are identified in the resource set and transmit a feedback message to the second wireless device 410 that includes or otherwise provides an indication of information associated with the result of the channel procedure measurement, e.g., for the active transmit beams of the second wireless device 410.

Figure 5:
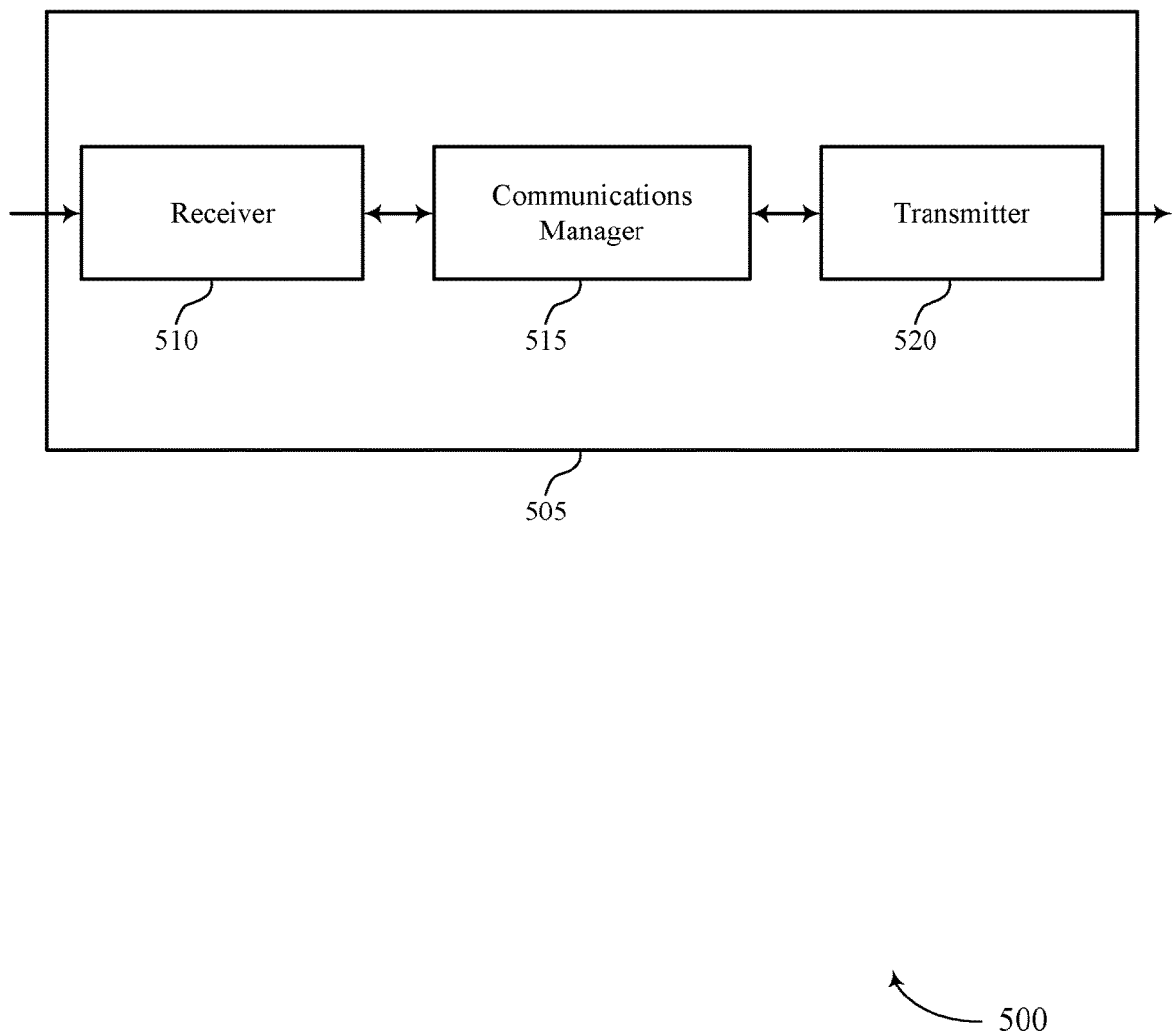
FIGS. 5 and 6 show block diagrams of devices that support beam reporting for active beams in accordance with aspects of the present disclosure.

FIG. 5 shows a block diagram 500 of a device 505 that supports beam reporting for active beams in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to beam reporting for active beams, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may determine that an active transmit beam has changed from a first transmit beam to a second transmit beam, the second transmit beam being different from the first transmit beam. The communications manager 515 may identify a reference signal identifier that is associated with the second transmit beam. The communications manager 515 may update, based on the identifying, a CSI resource setting to include the reference signal identifier, where the CSI resource setting is associated with the active transmit beam. The communications manager 515 may be an example of aspects of the communications manager 810 or 910 as described with reference to FIGS. 8 and 9.

The communications manager 515 or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
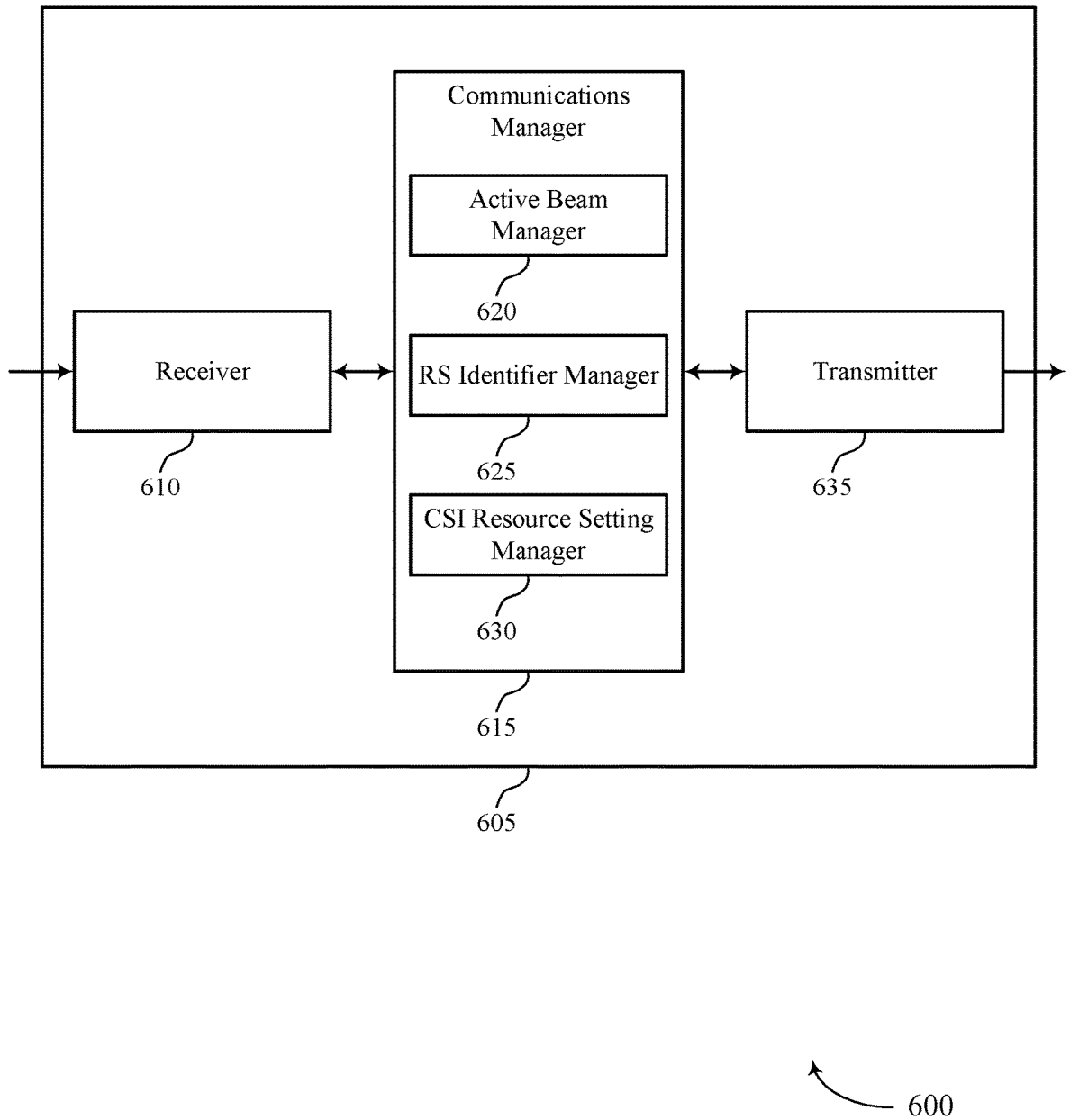

FIG. 6 shows a block diagram 600 of a device 605 that supports beam reporting for active beams in accordance with aspects of the present disclosure. The device 605 may be an example of aspects of a device 505, a UE 115, or a base station 105 as described with reference to FIGS. 1 and 5. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to beam reporting for active beams, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may include an active beam manager 620, a RS identifier manager 625, and a CSI resource setting manager 630. The communications manager 615 may be an example of aspects of the communications manager 810 or 910 as described with reference to FIGS. 8 and 9.

The active beam manager 620 may determine that an active transmit beam has changed from a first transmit beam to a second transmit beam, the second transmit beam being different from the first transmit beam.

The RS identifier manager 625 may identify a reference signal identifier that is associated with the second transmit beam.

The CSI resource setting manager 630 may update, based on the identifying, a CSI resource setting to include the reference signal identifier, where the CSI resource setting is associated with the active transmit beam.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
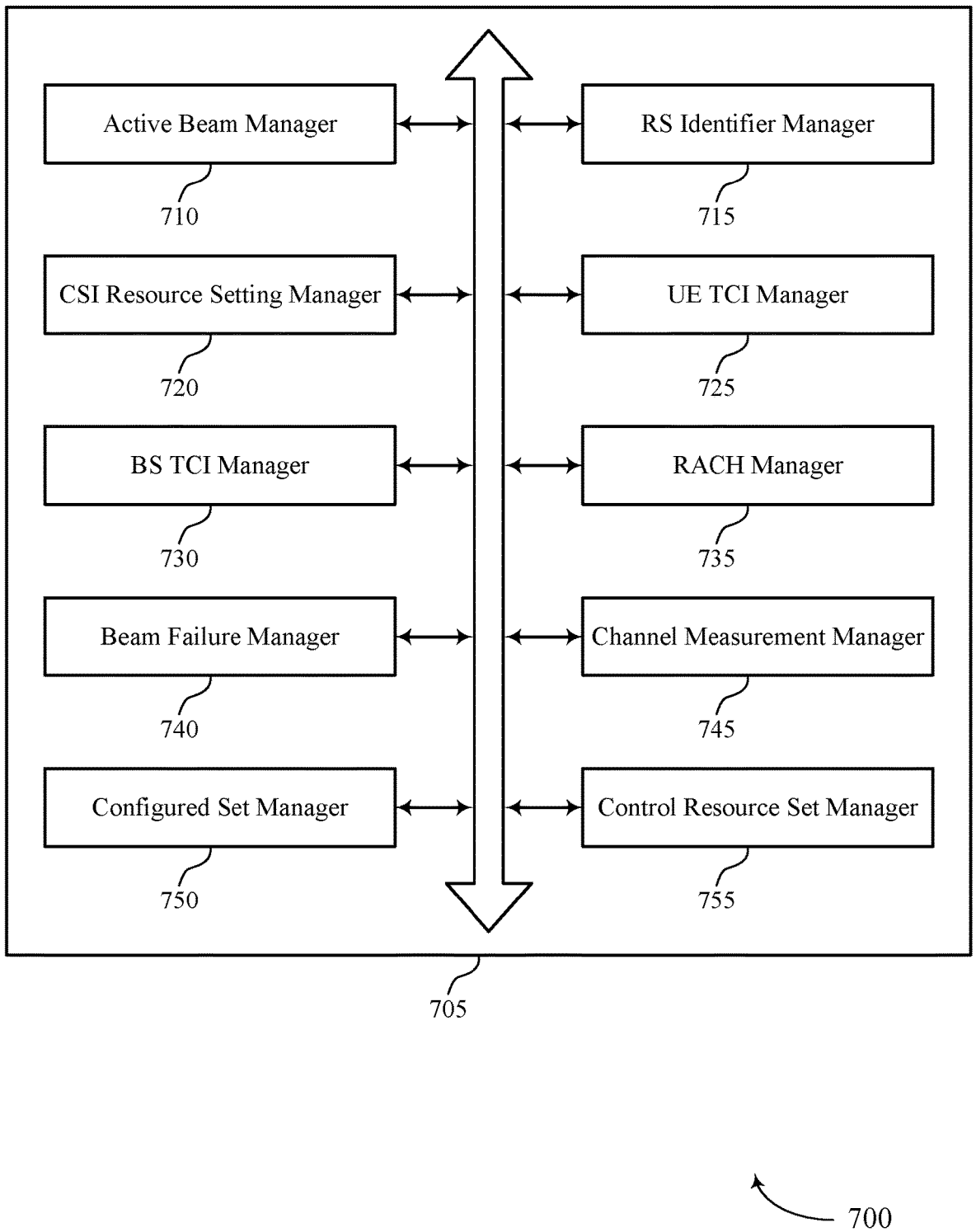
FIG. 7 shows a block diagram of a device that supports beam reporting for active beams in accordance with aspects of the present disclosure.

FIG. 7 shows a block diagram 700 of a communications manager 705 that supports beam reporting for active beams in accordance with aspects of the present disclosure. The communications manager 705 may be an example of aspects of a communications manager 515, a communications manager 615, or a communications manager 810 described with reference to FIGS. 5, 6, and 8. The communications manager 705 may include an active beam manager 710, a RS identifier manager 715, a CSI resource setting manager 720, an UE TCI manager 725, a BS TCI manager 730, a RACH manager 735, a beam failure manager 740, a channel measurement manager 745, a configured set manager 750, and a control resource set manager 755. Each of these modules may communicate, directly or indirectly, with one another (e.g., via one or more buses).

The active beam manager 710 may determine that an active transmit beam has changed from a first transmit beam to a second transmit beam, the second transmit beam being different from the first transmit beam. In some cases, the active transmit beam is associated with a control channel, or a data channel, or both the control channel and the data channel. In some cases, the active transmit beam is associated with a subset of configured control resources.

The RS identifier manager 715 may identify a reference signal identifier that is associated with the second transmit beam. In some cases, the identifier of the reference signal may include a SSB reference signal, or a PBCH block reference signal, or a CSI reference signal, or a SRS, or a BRS, or a BRRS, or a TRS, or a combination thereof.

The CSI resource setting manager 720 may update, based on the identifying, a CSI resource setting to include the reference signal identifier, where the CSI resource setting is associated with the active transmit beam.

The UE TCI manager 725 may receive a transmission configuration index that provides an indication of the reference signal identifier. In some examples, the UE TCI manager 725 may determine that the active transmit beam has changed to the second transmit beam based on the indication of the reference signal identifier being indicated in the transmission configuration index. In some examples, the UE TCI manager 725 may identify the reference signal identifier from the transmission configuration index.

The BS TCI manager 730 may configure, based on determining that the active transmit beam has changed to the second transmit beam, a transmission configuration index that provides an indication of the reference signal identifier. In some examples, the BS TCI manager 730 may transmit the transmission configuration index.

The RACH manager 735 may receive a RACH signal on the second transmit beam. In some examples, the RACH manager 735 may identify a reference signal associated with the RACH signal.

The beam failure manager 740 may identify a beam failure indication, where identifying the reference signal identifier associated with the second transmit beam is based on a beam failure recovery transmit beam. In some cases, the reference signal identifier that is associated with the second transmit beam includes an identifier of a reference signal that is used for beam failure detection of the active transmit beam.

The channel measurement manager 745 may perform a channel measurement procedure on one or more reference signals that are identified in the resource set. In some examples, the channel measurement manager 745 may transmit a feedback message including information associated with a result of the channel measurement procedure. In some examples, the channel measurement manager 745 may receive a trigger signal that indicates a measurement link, the measurement link including information associating the channel measurement procedure with the resource set, where the channel measurement procedure is initiated in response to, and based on the trigger signal.

The configured set manager 750 may identify a configured set of available reference signal, where identifying the reference signal identifier associated with the second transmit beam is based on the configured set of available reference signals. In some examples, the configured set manager 750 may determine that the reference signal identifier is not included in the configured set of available reference signals. In some examples, the configured set manager 750 may identify the reference signal identifier from a transmission configuration index.

The control resource set manager 755 may receive a configuration signal indicating a first control resource for a first symbol and a second control resource for a second symbol, where the configuration signal identifies either the first control resource or the second control resource as being available for channel measurement. In some examples, the control resource set manager 755 may update, based on the configuration signal, the CSI resource setting to include either the identified first control resource or the identified second control resource. In some examples, updating the CSI resource setting includes updating a resource set to include the reference signal identifier. In some cases, the resource set includes one or more reference signal identifiers, where each reference signal identifier is associated with a corresponding active transmit beam.

Figure 8:
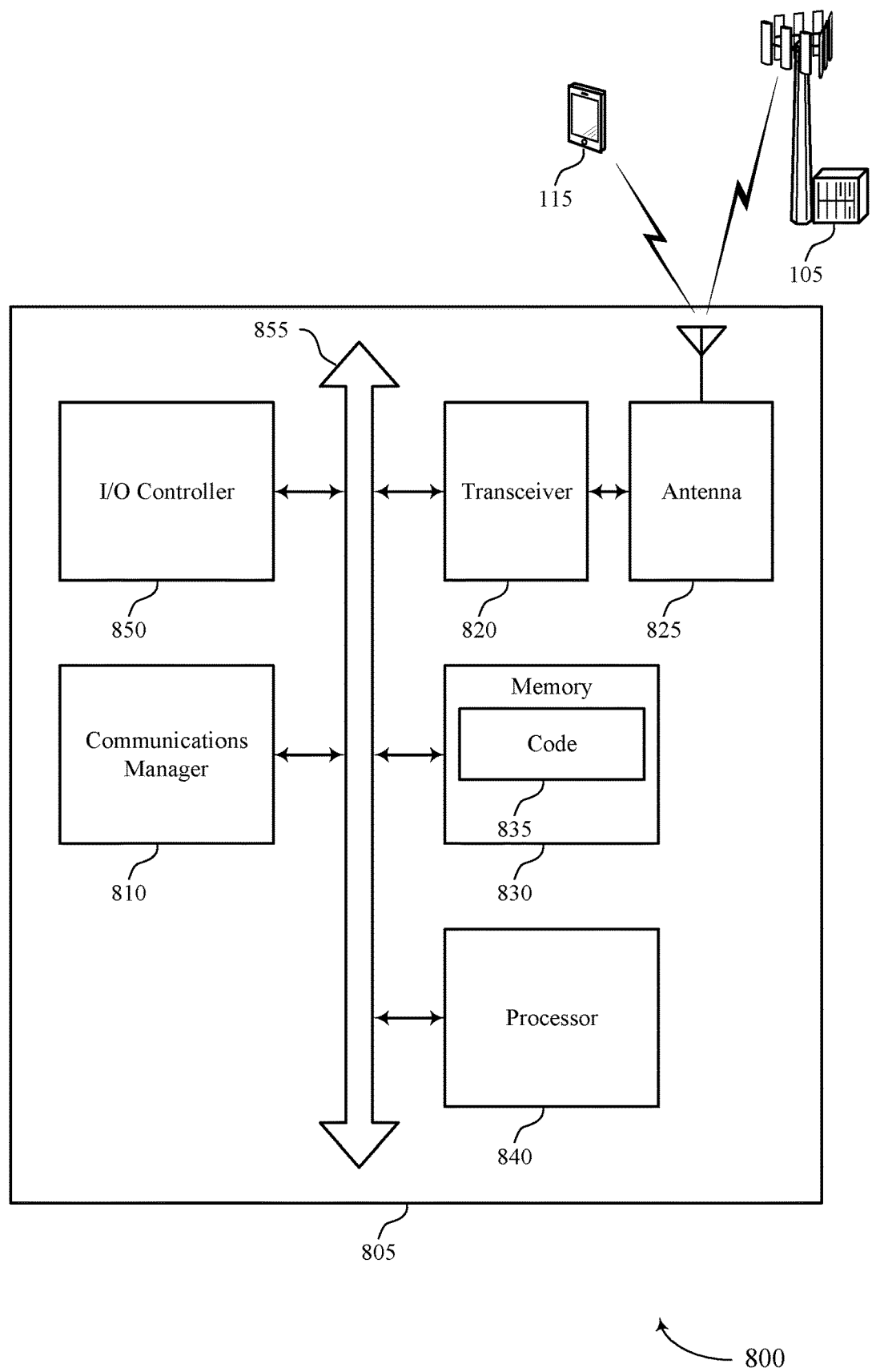
FIG. 8 shows a diagram of a system including a user equipment (UE) that supports beam reporting for active beams in accordance with aspects of the present disclosure.

FIG. 8 shows a diagram of a system 800 including a device 805 that supports beam reporting for active beams in accordance with aspects of the present disclosure. The device 805 may be an example of or include the components of device 505, device 605, or a UE 115 as described above, e.g., with reference to FIGS. 1, 5 and 6. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam reporting for active beams).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
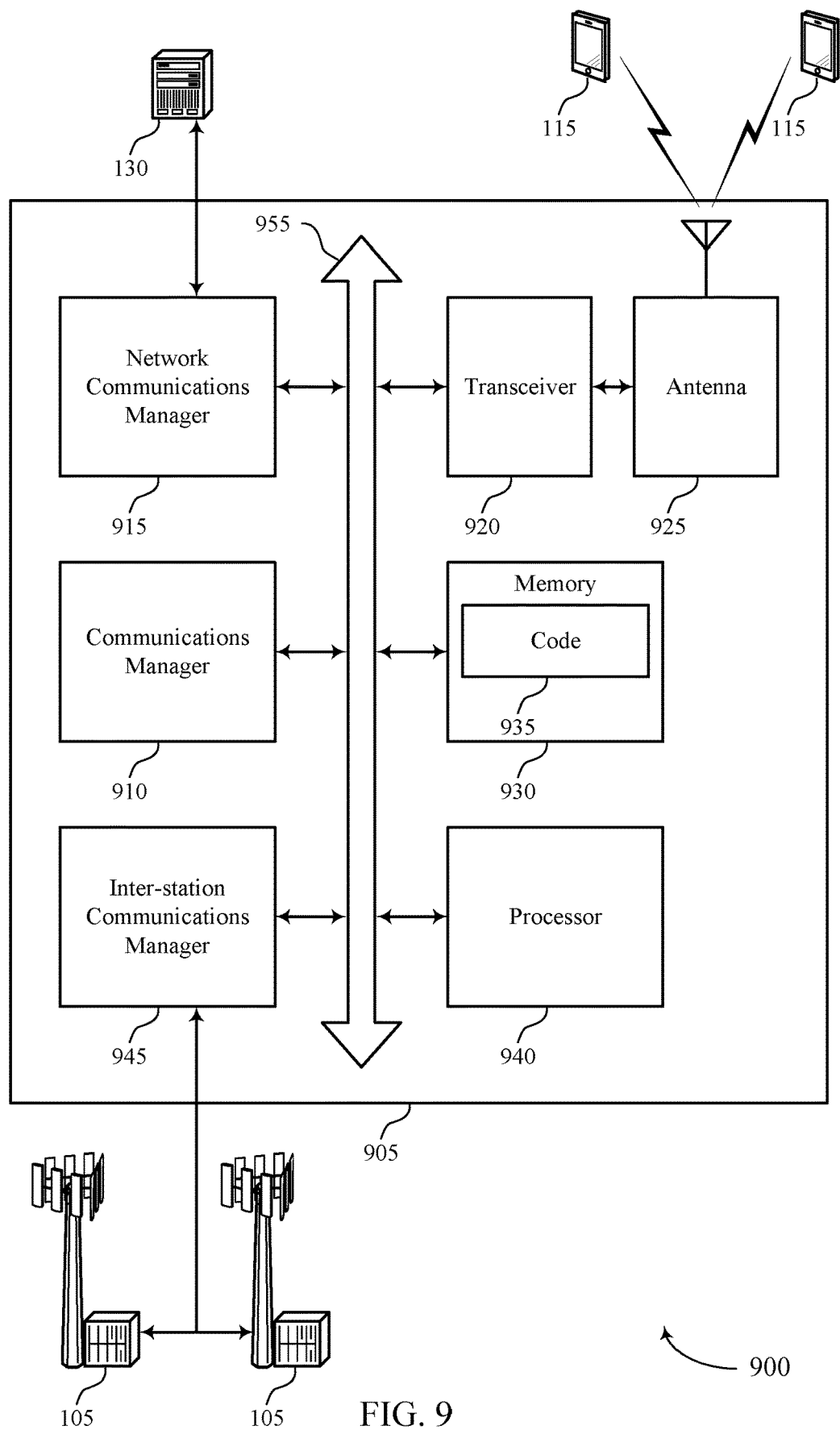
FIG. 9 shows a diagram of a system including a base station that supports beam reporting for active beams in accordance with aspects of the present disclosure.

FIG. 9 shows a diagram of a system 900 including a device 905 that supports beam reporting for active beams in accordance with aspects of the present disclosure. The device 905 may be an example of or include the components of device 505, device 605, or a base station 105 as described above, e.g., with reference to FIGS. 1, 5 and 6. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam reporting for active beams).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
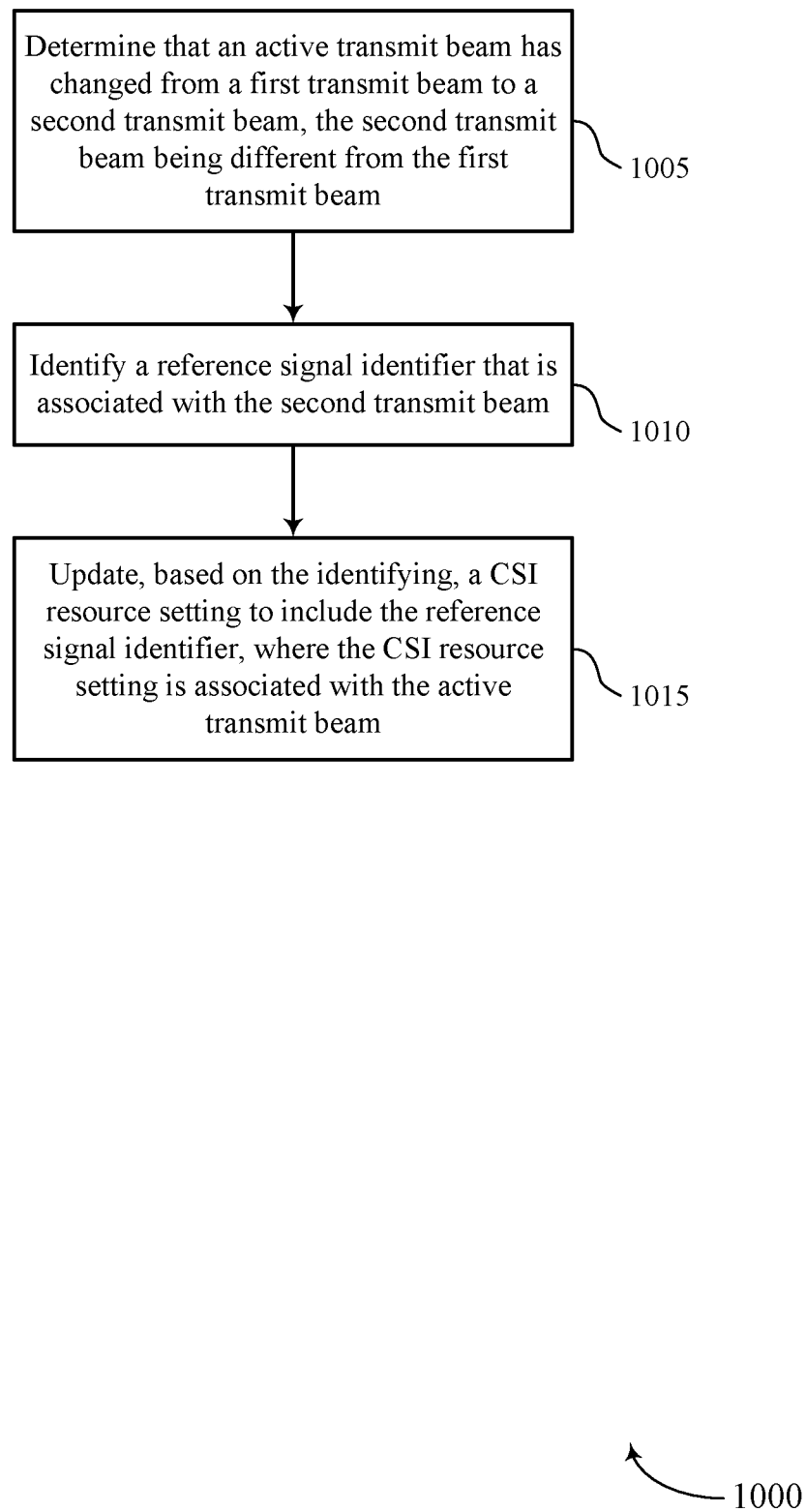
FIGS. 10 through 12 show flowcharts illustrating methods that support beam reporting for active beams in accordance with aspects of the present disclosure.

FIG. 10 shows a flowchart illustrating a method 1000 that supports beam reporting for active beams in accordance with aspects of the present disclosure. The operations of method 1000 may be implemented by a UE 115 or base station 105 or its components as described herein. For example, the operations of method 1000 may be performed by a communications manager as described with reference to FIGS. 5 to 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may determine that an active transmit beam has changed from a first transmit beam to a second transmit beam, the second transmit beam being different from the first transmit beam. The operations of 1005 may be performed according to the methods described herein. In some examples, aspects of the operations of 1005 may be performed by an active beam manager as described with reference to FIGS. 5 to 9.

At 1010, the UE or base station may identify a reference signal identifier that is associated with the second transmit beam. The operations of 1010 may be performed according to the methods described herein. In some examples, aspects of the operations of 1010 may be performed by a RS identifier manager as described with reference to FIGS. 5 to 9.

At 1015, the UE or base station may update, based at least in part on the identifying, a CSI resource setting to include the reference signal identifier, wherein the CSI resource setting is associated with the active transmit beam. The operations of 1015 may be performed according to the methods described herein. In some examples, aspects of the operations of 1015 may be performed by a CSI resource setting manager as described with reference to FIGS. 5 to 9.

Figure 11:
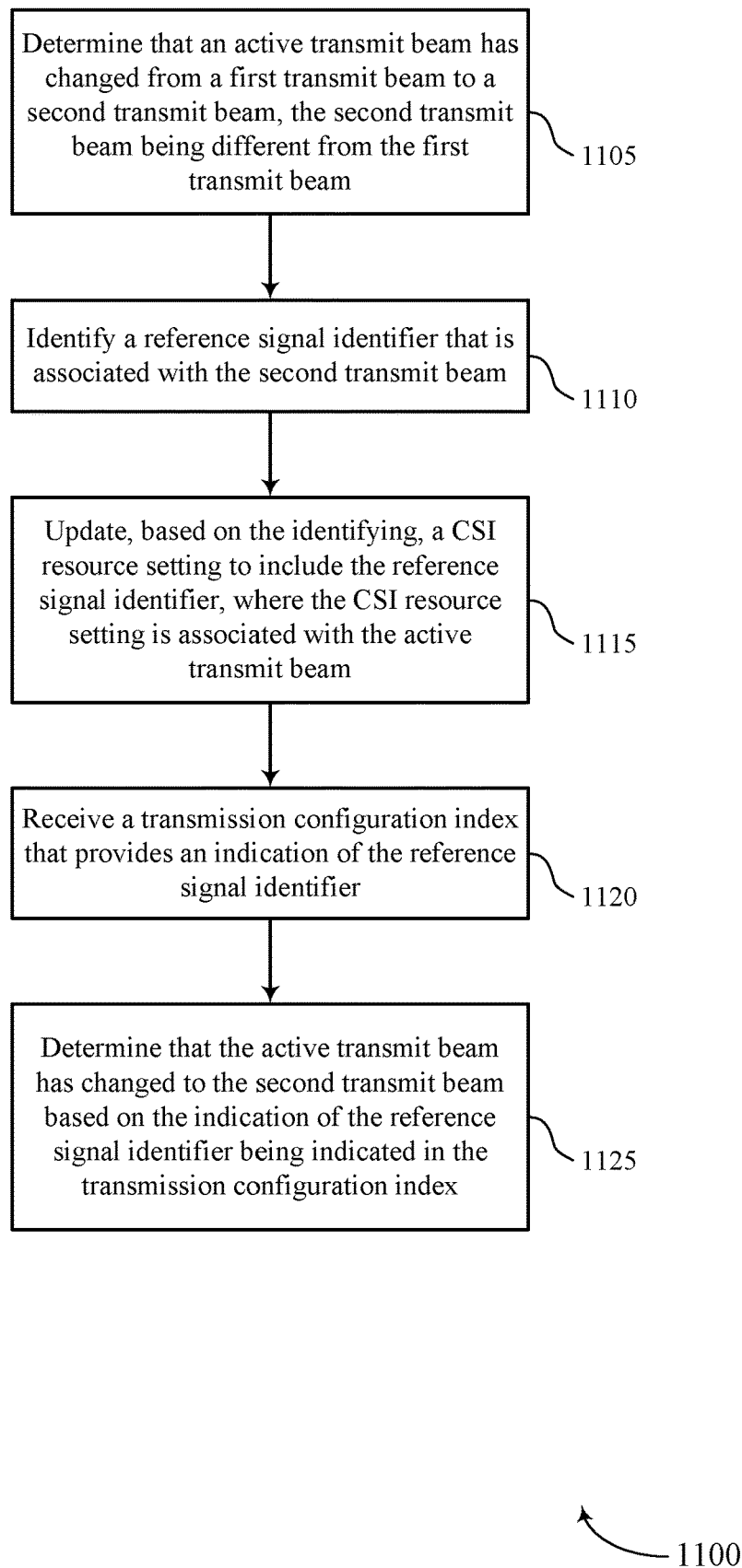

FIG. 11 shows a flowchart illustrating a method 1100 that supports beam reporting for active beams in accordance with aspects of the present disclosure. The operations of method 1100 may be implemented by a UE 115 or base station 105 or its components as described herein. For example, the operations of method 1100 may be performed by a communications manager as described with reference to FIGS. 5 to 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may determine that an active transmit beam has changed from a first transmit beam to a second transmit beam, the second transmit beam being different from the first transmit beam. The operations of 1105 may be performed according to the methods described herein. In some examples, aspects of the operations of 1105 may be performed by an active beam manager as described with reference to FIGS. 5 to 9.

At 1110, the UE or base station may identify a reference signal identifier that is associated with the second transmit beam. The operations of 1110 may be performed according to the methods described herein. In some examples, aspects of the operations of 1110 may be performed by a RS identifier manager as described with reference to FIGS. 5 to 9.

At 1115, the UE or base station may update, based at least in part on the identifying, a CSI resource setting to include the reference signal identifier, wherein the CSI resource setting is associated with the active transmit beam. The operations of 1115 may be performed according to the methods described herein. In some examples, aspects of the operations of 1115 may be performed by a CSI resource setting manager as described with reference to FIGS. 5 to 9.

At 1120, the UE or base station may receive a transmission configuration index that provides an indication of the reference signal identifier. The operations of 1120 may be performed according to the methods described herein. In some examples, aspects of the operations of 1120 may be performed by an UE TCI manager as described with reference to FIGS. 5 to 9.

At 1125, the UE or base station may determine that the active transmit beam has changed to the second transmit beam based at least in part on the indication of the reference signal identifier being indicated in the transmission configuration index. The operations of 1125 may be performed according to the methods described herein. In some examples, aspects of the operations of 1125 may be performed by an UE TCI manager as described with reference to FIGS. 5 to 9.

Figure 12:
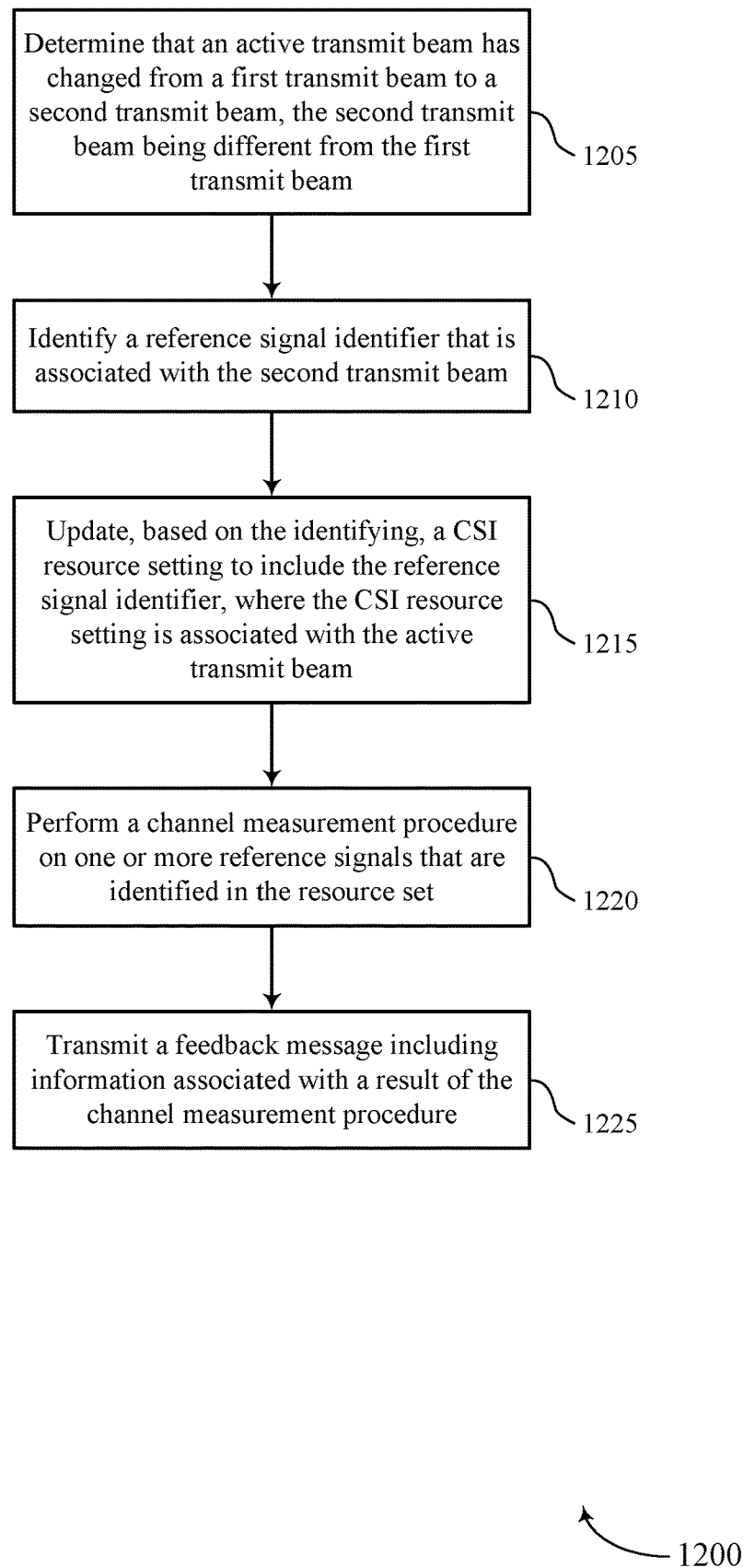

FIG. 12 shows a flowchart illustrating a method 1200 that supports beam reporting for active beams in accordance with aspects of the present disclosure. The operations of method 1200 may be implemented by a UE 115 or base station 105 or its components as described herein. For example, the operations of method 1200 may be performed by a communications manager as described with reference to FIGS. 5 to 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may determine that an active transmit beam has changed from a first transmit beam to a second transmit beam, the second transmit beam being different from the first transmit beam. The operations of 1205 may be performed according to the methods described herein. In some examples, aspects of the operations of 1205 may be performed by an active beam manager as described with reference to FIGS. 5 to 9.

At 1210, the UE or base station may identify a reference signal identifier that is associated with the second transmit beam. The operations of 1210 may be performed according to the methods described herein. In some examples, aspects of the operations of 1210 may be performed by a RS identifier manager as described with reference to FIGS. 5 to 9.

At 1215, the UE or base station may update, based at least in part on the identifying, a CSI resource setting to include the reference signal identifier, wherein the CSI resource setting is associated with the active transmit beam. The operations of 1215 may be performed according to the methods described herein. In some examples, aspects of the operations of 1215 may be performed by a CSI resource setting manager as described with reference to FIGS. 5 to 9.

At 1220, the UE or base station may perform a channel measurement procedure on one or more reference signals that are identified in the resource set. The operations of 1220 may be performed according to the methods described herein. In some examples, aspects of the operations of 1220 may be performed by a channel measurement manager as described with reference to FIGS. 5 to 9.

At 1225, the UE or base station may transmit a feedback message comprising information associated with a result of the channel measurement procedure. The operations of 1225 may be performed according to the methods described herein. In some examples, aspects of the operations of 1225 may be performed by a channel measurement manager as described with reference to FIGS. 5 to 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   determining that an active transmit beam has changed from a first transmit beam to a second transmit beam from a plurality of available transmit beams, the second transmit beam being different from the first transmit beam, each transmit beam in the plurality of available transmit beams mapped to a corresponding reference signal identifier associated with a resource set for a reference signal, the reference signal identifier being different from a beam identifier of the second transmit beam;
   identifying a reference signal identifier that is associated with the second transmit beam; and
   updating, based at least in part on the identifying, a channel state information (CSI) resource setting to include the resource set associated with the reference signal identifier, wherein the CSI resource setting is associated with the active transmit beam.

2. The method of claim 1, further comprising:
   receiving a transmission configuration index that provides an indication of the reference signal identifier; and
   determining that the active transmit beam has changed to the second transmit beam based at least in part on the indication of the reference signal identifier being indicated in the transmission configuration index.

3. The method of claim 2, further comprising:
   identifying the reference signal identifier from the transmission configuration index.

4. The method of claim 1, further comprising:
   configuring, based at least in part on determining that the active transmit beam has changed to the second transmit beam, a transmission configuration index that provides an indication of the reference signal identifier; and
   transmitting the transmission configuration index.

5. The method of claim 1, wherein determining that the active transmit beam has changed comprises:
   receiving a random access channel (RACH) signal on the second transmit beam.

6. The method of claim 5, wherein identifying the reference signal identifier that is associated with the second transmit beam comprises:
   identifying a reference signal associated with the RACH signal.

7. The method of claim 1, further comprising:
   identifying a beam failure indication, wherein identifying the reference signal identifier associated with the second transmit beam is based at least in part on a beam failure recovery transmit beam.

8. The method of claim 1, wherein the reference signal identifier that is associated with the second transmit beam comprises an identifier of a reference signal that is used for beam failure detection of the active transmit beam.

9. The method of claim 1, further comprising:
   performing a channel measurement procedure on one or more reference signals that are identified in the resource set; and
   transmitting a feedback message comprising information associated with a result of the channel measurement procedure.

10. The method of claim 9, further comprising:
    receiving a trigger signal that indicates a measurement link, the measurement link comprising information associating the channel measurement procedure with the resource set, wherein the channel measurement procedure is initiated in response to, and based at least in part on the trigger signal.

11. The method of claim 1, further comprising:
identifying a configured set of available reference signals, wherein identifying the reference signal identifier associated with the second transmit beam is based at least in part on the configured set of available reference signals.

12. The method of claim 11, further comprising:
determining that the reference signal identifier is not included in the configured set of available reference signals; and
identifying the reference signal identifier from a transmission configuration index.

13. The method of claim 1, wherein the active transmit beam is associated with a control channel, or a data channel, or both the control channel and the data channel.

14. The method of claim 1, wherein the active transmit beam is associated with a subset of configured control resources.

15. The method of claim 1, further comprising:
receiving a configuration signal indicating a first control resource for a first symbol and a second control resource for a second symbol, wherein the configuration signal identifies either the first control resource or the second control resource as being available for channel measurement, the resource set comprising the first control resource, the second control resource, or both; and
updating, based at least in part on the configuration signal, the CSI resource setting to include either the identified first control resource or the identified second control resource.

16. The method of claim 1, wherein:
updating the CSI resource setting comprises updating the resource set to include the reference signal identifier.

17. The method of claim 16, wherein the resource set comprises one or more reference signal identifiers, wherein each reference signal identifier is associated with a corresponding active transmit beam.

18. The method of claim 1, wherein the reference signal identifier comprises an identifier associated with at least one of: a synchronization signal block (SSB) reference signal, or a physical broadcast channel (PBCH) block reference signal, or a CSI reference signal, or a sounding reference signal (SRS), or a beam reference signal (BRS), or a beam refinement reference signal (BRRS), or a tracking reference signal (TRS), or a combination thereof.

19. The method of claim 1, wherein updating the CSI resource setting comprises:
excluding, based at least in part on the active transmit beam change, the reference signal identifier associated with the first transmit beam from the CSI resource setting.

20. An apparatus for wireless communications, comprising:
a processor,
memory coupled with the processor; and
instructions stored in the memory and executable by the processor, to cause the apparatus to:
determine that an active transmit beam has changed from a first transmit beam to a second transmit beam from a plurality of available transmit beams, the second transmit beam being different from the first transmit beam, each transmit beam in the plurality of available transmit beams mapped to a corresponding reference signal identifier associated with a resource set for a reference signal, the reference signal identifier being different from a beam identifier of the second transmit beam;
identify a reference signal identifier that is associated with the second transmit beam; and
update, based at least in part on the identifying, a channel state information (CSI) resource setting to include the resource set associated with the reference signal identifier, wherein the CSI resource setting is associated with the active transmit beam.

21. The apparatus of claim 20, wherein the instructions are further executable by the processor to cause the apparatus to:
receive a transmission configuration index that provides an indication of the reference signal identifier; and
determine that the active transmit beam has changed to the second transmit beam based at least in part on the indication of the reference signal identifier being indicated in the transmission configuration index.

22. The apparatus of claim 21, wherein the instructions are further executable by the processor to cause the apparatus to:
identify the reference signal identifier from the transmission configuration index.

23. The apparatus of claim 20, wherein the instructions are further executable by the processor to cause the apparatus to:
configure, based at least in part on determining that the active transmit beam has changed to the second transmit beam, a transmission configuration index that provides an indication of the reference signal identifier; and
transmit the transmission configuration index.

24. The apparatus of claim 20, wherein the instructions to determine that the active transmit beam has changed are executable by the processor to cause the apparatus to:
receive a random access channel (RACH) signal on the second transmit beam.

25. The apparatus of claim 24, wherein the instructions to identify the reference signal identifier that is associated with the second transmit beam are executable by the processor to cause the apparatus to:
identify a reference signal associated with the RACH signal.

26. The apparatus of claim 20, wherein the instructions are further executable by the processor to cause the apparatus to:
identify a beam failure indication, wherein identifying the reference signal identifier associated with the second transmit beam is based at least in part on a beam failure recovery transmit beam.

27. The apparatus of claim 20, wherein the reference signal identifier that is associated with the second transmit beam comprises an identifier of a reference signal that is used for beam failure detection of the active transmit beam.

28. The apparatus of claim 20, wherein the instructions are further executable by the processor to cause the apparatus to:
perform a channel measurement procedure on one or more reference signals that are identified in the resource set; and
transmit a feedback message comprising information associated with a result of the channel measurement procedure.

29. The apparatus of claim 28, wherein the instructions are further executable by the processor to cause the apparatus to:
receive a trigger signal that indicates a measurement link, the measurement link comprising information associating the channel measurement procedure with the resource set, wherein the channel measurement procedure is initiated in response to, and based at least in part on the trigger signal.

30. The apparatus of claim 20, wherein the instructions are further executable by the processor to cause the apparatus to:
identify a configured set of available reference signals, wherein identifying the reference signal identifier associated with the second transmit beam is based at least in part on the configured set of available reference signals.

31. The apparatus of claim 30, wherein the instructions are further executable by the processor to cause the apparatus to:
determine that the reference signal identifier is not included in the configured set of available reference signals; and
identify the reference signal identifier from a transmission configuration index.

32. The apparatus of claim 20, wherein the active transmit beam is associated with a control channel, or a data channel, or both the control channel and the data channel.

33. The apparatus of claim 20, wherein the active transmit beam is associated with a subset of configured control resources.

34. The apparatus of claim 20, wherein the instructions are further executable by the processor to cause the apparatus to:
receive a configuration signal indicating a first control resource for a first symbol and a second control resource for a second symbol, wherein the configuration signal identifies either the first control resource or the second control resource as being available for channel measurement, the resource set comprising the first control resource, the second control resource, or both; and
update, based at least in part on the configuration signal, the CSI resource setting to include either the identified first control resource or the identified second control resource.

35. The apparatus of claim 20, wherein the instructions to update the CSI resource setting are executable by the processor to cause the apparatus to update the resource set to include the reference signal identifier.

36. The apparatus of claim 35, wherein the resource set comprises one or more reference signal identifiers, wherein each reference signal identifier is associated with a corresponding active transmit beam.

37. The apparatus of claim 20, wherein the reference signal identifier comprises an identifier associated with at least one of: comprises a synchronization signal block (SSB) reference signal, or a physical broadcast channel (PBCH) block reference signal, or a CSI reference signal, or a sounding reference signal (SRS), or a beam reference signal (BRS), or a beam refinement reference signal (BRRS), or a tracking reference signal (TRS), or a combination thereof.

38. An apparatus for wireless communications, comprising:
means for determining that an active transmit beam has changed from a first transmit beam to a second transmit beam from a plurality of available transmit beams, the second transmit beam being different from the first transmit beam, each transmit beam in the plurality of available transmit beams mapped to a corresponding reference signal identifier associated with a resource set for a reference signal, the reference signal identifier being different from a beam identifier of the second transmit beam;
means for identifying a reference signal identifier that is associated with the second transmit beam; and
means for updating, based at least in part on the identifying, a channel state information (CSI) resource setting to include the resource set associated with the reference signal identifier, wherein the CSI resource setting is associated with the active transmit beam.

39. A non-transitory computer-readable medium storing code for wireless communications, the code comprising instructions executable by a processor to:
determine that an active transmit beam has changed from a first transmit beam to a second transmit beam from a plurality of available transmit beams, the second transmit beam being different from the first transmit beam, each transmit beam in the plurality of available transmit beams mapped to a corresponding reference signal identifier associated with a resource set for a reference signal, the reference signal identifier being different from a beam identifier of the second transmit beam;
identify a reference signal identifier that is associated with the second transmit beam; and
update, based at least in part on the identifying, a channel state information (CSI) resource setting to include the resource set associated with the reference signal identifier, wherein the CSI resource setting is associated with the active transmit beam.

* * * * *